United States Patent [19]
Ihlenfeld

[11] 3,935,805
[45] Feb. 3, 1976

[54] SPREADER CLOSURE
[75] Inventor: Russell E. Ihlenfeld, Allenton, Wis.
[73] Assignee: Dart Industries Inc., Los Angeles, Calif.
[22] Filed: Oct. 3, 1973
[21] Appl. No.: 403,206

[52] U.S. Cl. .................................. 99/300; 239/558
[51] Int. Cl.² ........................................ A47J 31/44
[58] Field of Search ............ 99/300, 304, 306, 307, 99/312, 314, 315, 316, 317–320; 239/558

[56] References Cited
UNITED STATES PATENTS
| 988,268 | 3/1911 | Holley | 99/312 |
| 1,803,356 | 5/1931 | Richheimer | 99/314 |
| 2,381,151 | 8/1945 | Wolcott | 99/316 |

Primary Examiner—Daniel Blum
Attorney, Agent, or Firm—Paul R. Wylie, Esq.; Kenneth J. Hovet, Esq.

[57] ABSTRACT

A spreader closure of the type used to cover a ground coffee receptacle in a coffee brewing apparatus adapted to receive and distribute hot water, said spreader closure having an upper surface portion divided into channels to direct hot water from a central portion to orifices leading through the spreader closure wall whereby the hot water will be evenly distributed over the ground coffee. A special frusto-conical orifice is provided which eliminates blockage due to surface tension.

3 Claims, 5 Drawing Figures

SPREADER CLOSURE

BACKGROUND OF THE INVENTION

Coffee making devices typically require a spreader closure for a ground coffee receptacle with the function of the spreader closure being twofold-first to provide a closure for the receptacle and secondly, to provide a means for evenly distributing hot water over the ground coffee.

SUMMARY OF THE INVENTION

The present invention relates to a spreader closure for receiving and distributing hot water in a coffee making apparatus. The spreader closure of the invention has a central water receiving portion and a downwardly inclined surface extending from the central water receiving portion, a plurality of orifices are located on the inclined surface to pass water through the spreader closure. Upstanding divider means on the upper portion of the downwardly inclined surface are provided to form separate water flow channels for each of said orifices. A feature of the invention in an embodiment where the orifices are symmetrically disposed on the upper surface of the spreader closure is the provision of first and second sets of said orifices, the orifices of each set being radially and angularly displaced a distance from the orifices of the other set and wherein the upstanding divider means are disposed such that each of the separate water flow channels has an opening adjacent the central water receiving portion.

A further feature of this invention resides in the configuration of the orifices themselves which are provided with a frusto-conical configuration whereby flow of water through each of the orifices is assured and blockage of the orifice due to surface tension or other phenomena is eliminated.

An advantage of the foregoing summarily described invention and specific feature is the equal division and distribution of water received on the spreader closure to the ground coffee in the receptacle beneath the closure.

It was an object of the invention to provide a simple, economical and reliable coffee maker to evenly distribute hot water over ground coffee in a receptacle without blockage due to surface tension.

Another object of the invention is to provide a spreader closure for a coffee maker which can be formed of plastic materials and which can be molded in a single integral piece.

Another object of the invention is the provision of a spreader closure which can be provided with a locking means whereby it will not be inadvertently separated from a ground coffee receptacle.

Further objects and advantages of the invention will be apparent from the following specification, appended claims and accompanying drawing.

DETAILED DESCRIPTION OF THE PREFERRED EMBODIMENT

Figure 1:
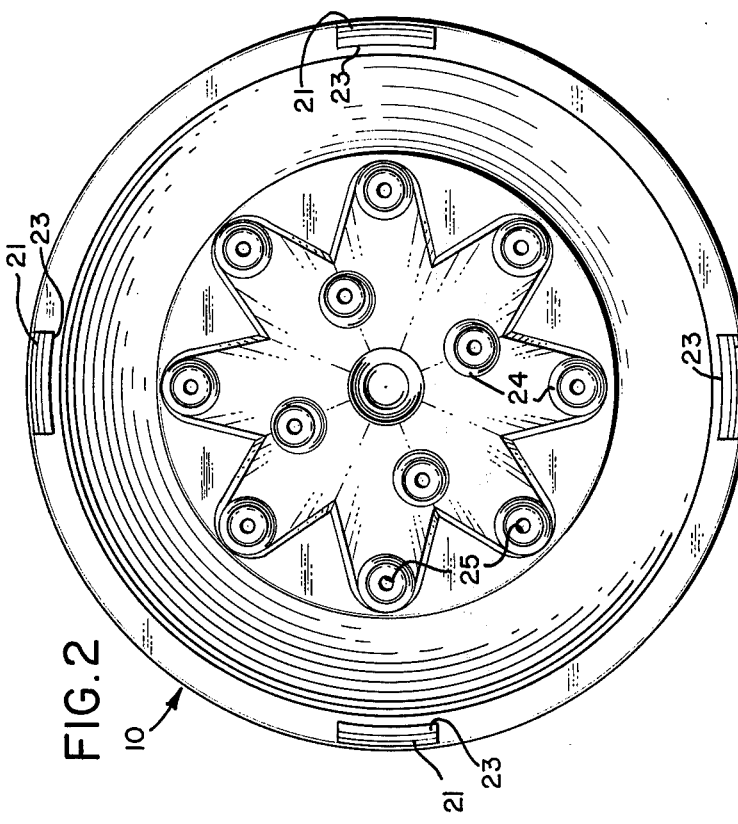
FIG. 1 is a top plan view of a preferred spreader closure for a coffee maker in accordance with the present invention.
Figure 2:
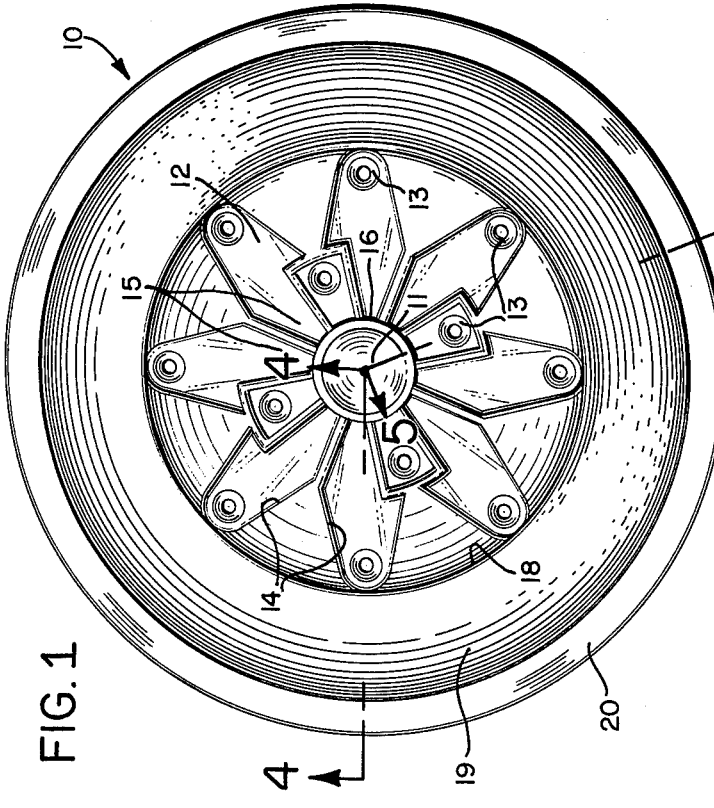
FIG. 2 is a bottom plan view of the spreader closure shown in FIG. 1.
Figure 3:
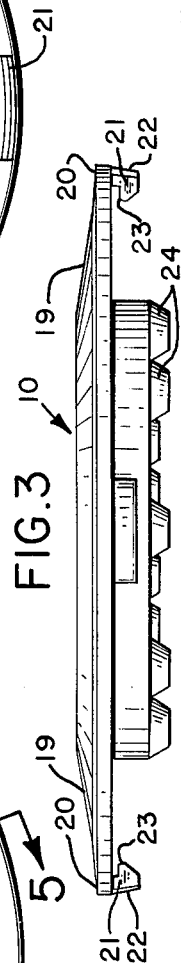
FIG. 3 is a front elevation view of the spreader closure shown in FIG. 1.
Figure 5:
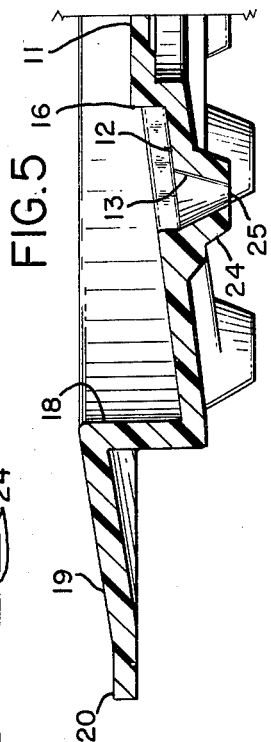
FIG. 5 is an enlarged cross-section view taken along lines 5—5 of FIG. 1.
Figure 4:
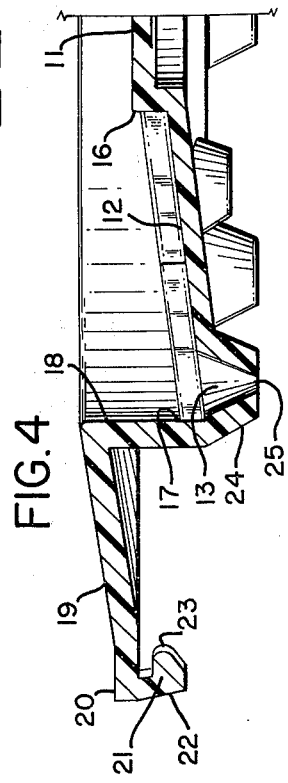
FIG. 4 is an enlarged cross-section view taken along lines 4—4 of FIG. 1.

As shown in the various Figures of the drawing, the spreader closure 10 comprises a central water receiving portion 11 and a downwardly inclined surface 12 adjacent said central water receiving portion 11. A plurality of orifices 13 are disposed symmetrically with respect to an axis passing through the central water receiving portion. A number of upstanding divider means 14, formed as upstanding ridges, divide the downwardly inclined surface 12 into separate water flow channels 15 which supply water coming from the central water receiving portion 11 to each of the orifices 13.

As shown, the orifices 13 on the spreader closure 10 are provided in two sets with a first set of orifices 13 being positioned radially outwardly from a second set of said orifices, all with respect to said central water receiving portion. Each orifice 13 of said first set of said orifices is also angularly displaced from each orifice 13 of said second set of said orifices. Due to such radial and angular displacement of the various sets of orifices 13 it is possible to position divider means 14 in a manner such that each of the channels 15 that supply water to the orifices 13 is adjacent the central water receiving portion 11 whereby water being supplied to such receiving portion 11 will be distributed to each of the orifices. Moreover, in the embodiment shown, the entrance 16 to each of the channels 15 is substantially equal in size thereby tending to divide the water equally around the circumference of the spreader closure 10.

The downwardly inclined surface 12 terminates in a peripheral edge portion 17 which as shown is formed as an upstanding wall 18. Extending outwardly from said upstanding wall is an outwardly downwardly flared wall 19 terminating in an edge portion 20. Locking means 21 on said edge portion 20 is formed with a downwardly extending wall 22 and inwardly extending lug 23 adapted to engage and secure the spreader closure 10 to complimentary locking means on a ground coffee receptacle (not shown). As shown, locking means 21 are intermittently disposed around the edge portion 20 of said spreader closure.

In a preferred embodiment according to the invention each of the orifices 13 is of frusto conical formation with the axial length of the orifice being greater than the thickness of downwardly inclined surface 12 resulting in the extension of the lower portion 24 of the orifice 13 below the underside of downwardly inclined surface 12. This particular configuration assures that water exiting from outlet opening 25 in the orifices will not impinge upon and be carried down the outside of downwardly inclined surface 12, but instead will drip or flow directly downwardly from the lower portion 24 of orifices 13. The frusto-conical configuration of the orifices 13 results in continuous flow of water through the orifice eliminating blockage due to surface tension which frequently occurs in orifices having either a straight cylindrical configuration or other configurations where the opening of the orifice is the same size or smaller than the outlet.

The spreader closure is useful in any type of coffee brewing apparatus where ground coffee is contained in a receptacle and contacted with hot water from above during the coffee brewing process. The spreader closure shown herein is particularly useful in co-pending application, Ser. No. 400,197 filed Sept. 24, 1973, now U.S. Pat. No. 3,869,968 issued Mar. 11, 1975.

It will be apparent to those skilled in the art that various modifications may be resorted to without departing from the spirit of the invention.

I claim:

1. A spreader closure for receiving and distributing hot water in a coffee maker apparatus or the like comprising:
    a central water receiving portion;
    a downwardly inclined surface having upper and lower portions, said surface extending outwardly from said central water receiving portion to an upstanding peripheral wall;
    at least two sets of individual orifices located on said downwardly inclined surface to pass water through said spreader closure including a first set of said orifices positioned radially outwardly from a second set of orifices with respect to said central water receiving portion and each orifice of said first set of orifices being angularly displaced from each orifice of said second set of orifices such that the hot water is substantially evenly distributed;
    divider means extending upwardly from the upper portion of said downwardly inclined surface and radially outwardly from said central water receiving portion wherein each of said divider means is about equally angularly spaced apart about the periphery of said water receiving portion to define separate water flow channels for each of said orifices and each channel communicating and directing water flow to only a single orifice.

2. A spreader closure according to claim 1 wherein said upstanding divider means and said orifices are symmetrically disposed about an axis passing through said central water receiving portion.

3. A spreader closure according to claim 1 wherein said orifices extend in an axial direction a length greater than the thickness of the surface upon which said orifices are disposed with the outlet end thereof being below the bottom portion of said surface whereby water passing through said orifice will drip directly downward below said frusto-conical orifice without impinging upon the outside of said surface.

* * * * *